United States Patent
Mukhopadhyay et al.

(10) Patent No.: US 9,297,277 B2
(45) Date of Patent: Mar. 29, 2016

(54) POWER PLANT

(75) Inventors: Debabrata Mukhopadhyay, Karnataka (IN); Abhishek Agrawal, Haryana (IN); Vishwas Kumar Pandey, Karnataka (IN); Nestor Hernandez Sanchez, Schenectady, NY (US); Donkada Santhosh, Karnataka (IN)

(73) Assignee: General Electric Company, Schenectady, NY (US)

( * ) Notice: Subject to any disclaimer, the term of this patent is extended or adjusted under 35 U.S.C. 154(b) by 1216 days.

(21) Appl. No.: 13/250,332

(22) Filed: Sep. 30, 2011

(65) Prior Publication Data

US 2013/0081373 A1  Apr. 4, 2013

(51) Int. Cl.
*F01D 25/12* (2006.01)
*F01K 13/02* (2006.01)
*F01K 7/02* (2006.01)

(52) U.S. Cl.
CPC . *F01K 7/02* (2013.01); *F01D 25/12* (2013.01); *F01K 13/02* (2013.01); *F05D 2260/2322* (2013.01); *Y02E 20/16* (2013.01)

(58) Field of Classification Search
CPC ... F05B 2260/603; F01D 11/04; F01D 11/06; F01D 25/12; F05D 2260/232; F05D 2260/2322; F01K 7/02–7/04
USPC .............. 60/643–683; 415/168.1–168.4, 112, 415/116, 117, 174.5, 175, 176
See application file for complete search history.

(56) References Cited

U.S. PATENT DOCUMENTS

| | | | | |
|---|---|---|---|---|
| 2,451,261 | A | * | 10/1948 | Warren .................... F01K 3/265 277/412 |
| 3,302,951 | A | * | 2/1967 | Olesen .......................... 277/304 |
| 4,189,156 | A | * | 2/1980 | Geary et al. .................. 277/304 |
| 5,388,411 | A | * | 2/1995 | McKeever et al. .............. 60/646 |
| 6,010,302 | A |   | 1/2000 | Oeynhausen |
| 6,227,799 | B1 |  | 5/2001 | Kuhn et al. |
| 6,422,817 | B1 |  | 7/2002 | Jacala |
| 6,443,690 | B1 | * | 9/2002 | Zabrecky et al. ............... 415/29 |
| 6,517,312 | B1 |  | 2/2003 | Jones et al. |
| 6,773,227 | B2 |  | 8/2004 | Montgomery |

(Continued)

FOREIGN PATENT DOCUMENTS

| | | |
|---|---|---|
| EP | 0252007 A2 | 1/1988 |
| EP | 0275192 A2 | 7/1988 |

(Continued)

OTHER PUBLICATIONS

Search Report from FR Application No. 1259045 dated Sep. 27, 2013.

(Continued)

*Primary Examiner* — Thomas Denion
*Assistant Examiner* — Laert Dounis
(74) *Attorney, Agent, or Firm* — Ernest G. Cusick; Hoffman Warnick LLC

(57) ABSTRACT

A power plant is provided and includes components for generating power from fluids at high and intermediate pressures, a pathway defined between the components along which a heated fluid flows to the one of the components for generating power from fluids at intermediate pressures and a circuit fluidly coupled to the pathway to cool a portion of the heated fluid prior to the portion of the heated fluid reaching the one of the components for generating power from fluids at intermediate pressures.

18 Claims, 1 Drawing Sheet

(56) References Cited

U.S. PATENT DOCUMENTS

| | | | |
|---|---|---|---|
| 6,957,949 B2 | 10/2005 | Hyde et al. | |
| 7,147,437 B2 | 12/2006 | Burdgick et al. | |
| 7,296,964 B2 | 11/2007 | Montgomery | |
| 7,461,544 B2 | 12/2008 | Kumar et al. | |
| 7,635,250 B2 | 12/2009 | Montgomery et al. | |
| 7,866,949 B2 | 1/2011 | Bracken et al. | |
| 8,257,017 B2* | 9/2012 | Down et al. | 415/1 |
| 8,689,557 B2* | 4/2014 | Maki et al. | 60/653 |
| 2003/0061797 A1* | 4/2003 | Hyakutake | F01K 23/108 60/39.182 |
| 2004/0136828 A1 | 7/2004 | Montgomery | |
| 2005/0182576 A1 | 8/2005 | Smith | |
| 2007/0071594 A1 | 3/2007 | Montgomery | |
| 2007/0193739 A1 | 8/2007 | Smith et al. | |
| 2007/0220860 A1 | 9/2007 | Montgomery et al. | |
| 2009/0025389 A1* | 1/2009 | Hernandez et al. | 60/663 |
| 2009/0196735 A1 | 8/2009 | Bracken et al. | |
| 2009/0208323 A1 | 8/2009 | Bowen et al. | |
| 2009/0246004 A1* | 10/2009 | Schmitt | 415/168.1 |
| 2010/0008756 A1* | 1/2010 | Inomata et al. | 415/14 |
| 2010/0263605 A1 | 10/2010 | Sengar et al. | |
| 2010/0316488 A1* | 12/2010 | Hofer | 415/144 |
| 2011/0214426 A1* | 9/2011 | Mehra et al. | 60/645 |
| 2012/0036852 A1* | 2/2012 | Beveridge et al. | 60/653 |

FOREIGN PATENT DOCUMENTS

| | | |
|---|---|---|
| EP | 0384181 A2 | 8/1990 |
| EP | 0422221 A1 | 4/1991 |
| EP | 0432287 A1 | 6/1991 |
| EP | 0637476 A1 | 2/1995 |
| EP | 0735240 A1 | 10/1996 |
| EP | 0735243 A3 | 10/1996 |
| EP | 0753704 A1 | 1/1997 |
| EP | 0759499 A1 | 2/1997 |
| EP | 0761836 A1 | 3/1997 |
| EP | 0767250 A3 | 12/1997 |
| EP | 0816726 A1 | 1/1998 |
| EP | 0764767 A3 | 5/1998 |
| EP | 0849434 A2 | 6/1998 |
| EP | 0881360 A1 | 12/1998 |
| EP | 1752614 A2 | 2/2007 |
| EP | 1770184 A1 | 4/2007 |
| EP | 1777372 A2 | 4/2007 |
| EP | 1793092 A1 | 6/2007 |
| EP | 1795714 A1 | 6/2007 |
| EP | 1818504 A2 | 8/2007 |
| EP | 1837505 A1 | 9/2007 |
| EP | 1845234 A1 | 10/2007 |
| EP | 1860356 A2 | 11/2007 |
| EP | 1870564 A2 | 12/2007 |
| EP | 1892307 A1 | 2/2008 |
| EP | 1906181 A2 | 4/2008 |
| EP | 1930095 A2 | 6/2008 |
| EP | 1930099 A1 | 6/2008 |
| EP | 1930100 A2 | 6/2008 |
| EP | 1930543 A1 | 6/2008 |
| EP | 1975372 A1 | 10/2008 |
| EP | 1985946 A2 | 10/2008 |
| JP | 2007113572 A | 5/2007 |
| JP | 2007-255422 A | 10/2007 |
| JP | 2009-185810 A | 8/2009 |
| JP | 2009191848 A | 8/2009 |
| WO | 9201293 A1 | 1/1992 |
| WO | 9427034 A1 | 11/1994 |
| WO | 9709515 A1 | 3/1997 |
| WO | 9743530 A1 | 11/1997 |
| WO | 9827330 A1 | 6/1998 |
| WO | 9829917 A1 | 7/1998 |
| WO | 0060226 A1 | 10/2000 |
| WO | 03100233 A2 | 12/2003 |
| WO | 2004067933 A2 | 8/2004 |
| WO | 2005093222 A2 | 10/2005 |
| WO | 2005108758 A1 | 11/2005 |
| WO | 2012151055 A2 | 11/2012 |

OTHER PUBLICATIONS

English Translation of JP2010-1389136A (orginial JP publication could not be found).

* cited by examiner

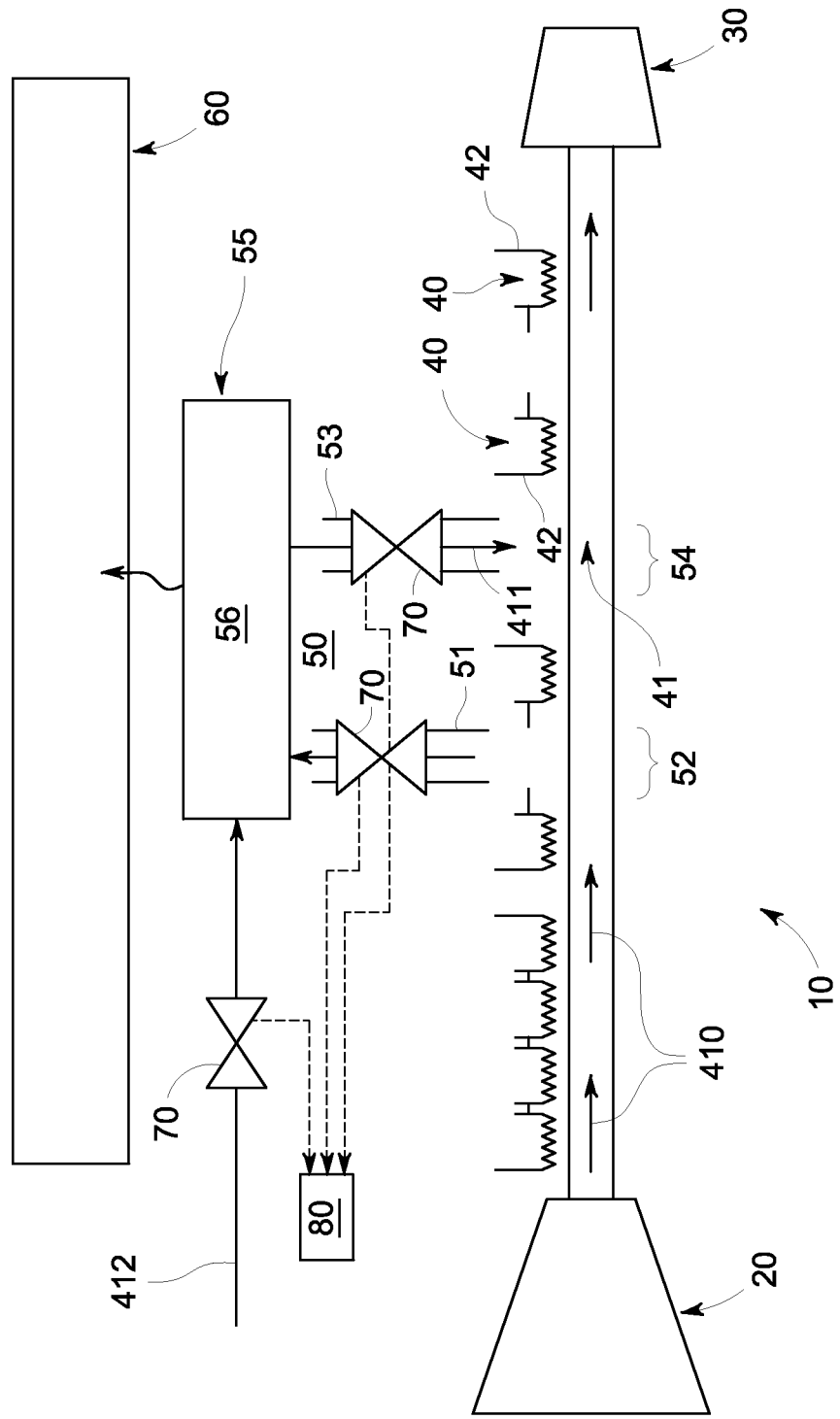

POWER PLANT

BACKGROUND OF THE INVENTION

The subject matter disclosed herein relates to a power plant and, more particularly, to a power plant having cooled fluid.

In power plants, gas turbine engine exhaust or other forms of energy (i.e., energy produced in fossil fuel burning plants, nuclear power plants, geothermal power plants and/or solar power plants) is employed to generate steam normally at one or more of high, intermediate and low pressures for a one to three pressure level heat recovery steam generator (HRSG). In the three pressure case, this steam is communicated to high, intermediate and low pressure steam turbines where the steam is used in the generation of power. While this configuration is efficient, leakage of high energy fluid from the high pressure steam turbine toward the intermediate pressure steam turbine can lead to reduced performance as the intermediate pressure steam turbine normally runs at elevated temperatures similar to the high pressure section but with increased diameters. This can result in increased mechanical stresses that may cause damage or reduction of component life. Thus, it is often necessary to cool the intermediate pressure steam turbine section by utilizing relatively cool steam from external sources.

The cooling of the leakage to eventually cool down the intermediate pressure section has been achieved by extraction of relatively cool pressurized steam from intermediate locations in the high pressure steam turbine. This solution can lead to performance losses, however, as the steam used for cooling could otherwise be used to produced useful energy output.

BRIEF DESCRIPTION OF THE INVENTION

According to one aspect of the invention, a power plant is provided and includes components for generating power from fluids at high and intermediate pressures, a pathway defined between the components along which a heated fluid flows to the one of the components for generating power from fluids at intermediate pressures and a circuit fluidly coupled to the pathway to cool a portion of the heated fluid prior to the portion of the heated fluid reaching the one of the components for generating power from fluids at intermediate pressures.

According to another aspect of the invention, a power plant is provided and includes first and second components for generating power from first and second fluids at first and second pressures, respectively, the second pressure being lower than the first pressure, a plurality of intermediate components defining a pathway along which a third fluid at a first temperature flows from the first component to the second component and a circuit fluidly coupled to the pathway to expose or combine a portion of the third fluid to or with a fourth fluid at a second temperature, which is lower than the first temperature, prior to the portion of the third fluid reaching the second component.

According to yet another aspect of the invention, a power plant is provided and includes a high pressure steam turbine for generating power from high pressure steam, an intermediate pressure steam turbine for generating power from intermediate pressure steam, a plurality of seals defining a pathway along which steam leakage at a high temperature flows from the high pressure steam turbine to the intermediate pressure steam turbine and a circuit fluidly coupled to the pathway to expose or combine a portion of the steam leakage to or with exhaust output of one of the high and intermediate pressure steam turbines prior to the portion of the steam leakage reaching the intermediate pressure steam turbine.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawing in which:

The sole FIGURE is a schematic illustration of a portion of a power plant having a high pressure-low pressure configuration.

The detailed description explains embodiments of the invention, together with advantages and features, by way of example with reference to the drawings.

DETAILED DESCRIPTION OF THE INVENTION

With reference to the sole FIGURE, a power plant ("power plant") 10 is provided. The power plant 10 may be any type of power plant, such as a combined cycle power plant, a fossil fuel burning plant, a nuclear power plant, a geothermal power plant and/or a solar power plant. For the purpose of clarity and brevity, however, the power plant 10 will be described below as a combined cycle power plant. It is to be understood that this description is merely exemplary.

The power plant 10 includes a first component 20 and a second component 30 for generating power from first and second fluids at first and second pressures, respectively, where the second pressure is lower than the first pressure. The power plant 10 further includes a plurality of intermediate sealing components 40 and a circuit 50. The plurality of intermediate sealing components 40 may be configured to define a pathway 41 along which a third fluid 410 at a first temperature flows from the first component 20 to the second component 30. The circuit 50 is fluidly coupled to the pathway 41 to expose a portion 411 of the third fluid 410 to a fourth fluid 412. In accordance with embodiments, the circuit 50 is fluidly coupled to the pathway 41 to combine the portion 411 of the third fluid 410 to the fourth fluid 412. This exposure or combination occurs prior to the portion 411 of the third fluid 410 reaching the second component 30. The fourth fluid 412 is provided at a second temperature, which is lower than the first temperature, such that the fourth fluid cools the portion 411 of the third fluid 410.

The first and second components 20 and 30 may include high and intermediate pressure steam turbines, respectively. As such, the first and second fluids may include high and intermediate pressure steam, respectively. The plurality of intermediate sealing components 40 may include a plurality of seals 42 disposed between the first and second components 20 and 30. The seals 42 may be any kind of seals or combinations of different kinds of seals 42. In accordance with embodiments, the seals 42 may include labyrinth seals disposed between the first and second components 20 and 30. The third fluid 410 may include steam leakage that leaks from the first component 20 to the second component 30. The fourth fluid 412 may include exhaust output of one or more of the first and second components 20 and 30 or another similar feature.

The circuit 50 includes a first conduit 51 that taps into the pathway 41 at a first location 52, a second conduit 53 that taps into the pathway 41 at a second location 54, which is located between the first location 52 and the second component 30, and a mixing chamber 55. The mixing chamber 55 may be a chamber, pipe connections and/or any other flow mixing device and is fluidly coupled to the first and second conduits 51 and 53. In accordance with embodiments, the mixing chamber 55 may be defined to form an interior 56 in which the portion 411 of the third fluid 410 may be exposed to or combined with the fourth fluid 412.

In accordance with further embodiments, a heat exchanger 60 of any configuration may be coupled to the mixing chamber 55. Heat may therefore be removed from at least the portion 411 of the third fluid 410 at the heat exchanger 60 or within an interior thereof. In accordance with alternative embodiments, the heat exchanger 60 may be disposed within the mixing chamber 55 or may replace the mixing chamber 55 altogether. As such, the heat exchanger 60 may be indirectly or directly fluidly coupled to the first and second conduits 51 and 53.

In accordance with still further embodiments, the circuit 50 may expose approximately 3 parts of the portion 411 of the third fluid 410 to approximately 8 parts of the fourth fluid 412 to achieve an approximately 3:8 fluid ratio. In accordance with alternative embodiments, the circuit 50 may combine approximately 3 parts of the portion 411 of the third fluid 410 with approximately 8 parts of the fourth fluid 412 to again achieve an approximately 3:8 fluid ratio. Thus, if the third fluid 410 is provided at approximately 1,000 degrees Fahrenheit and the fourth fluid 412 is provided at approximately 600 degrees Fahrenheit, the portion 411 of the third fluid 410 will reach the second component 30 following the fluid combination at approximately 700-750 degrees Fahrenheit. These mixing proportions are, of course, to be understood as being merely exemplary and may depend on various factors, such as control valve (to be discussed below) settings. In the exposure case, the fourth fluid 412, having been heated by the portion 411 of the third fluid 410, may be provided to an additional power generation component to avoid dumping or wasting the heat added thereto.

Control valves 70 can be implemented in or along first conduit 51, second conduit 53 and/or a line carrying fourth fluid 412 to achieve predefined and/or required mixing temperatures and mass flows. These control valves 70 may be coupled to an active control system 80 that would determine the appropriate configurations depending on at least load conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power plant, comprising:
  components for generating power from fluids at high and intermediate pressures;
  a pathway defined directly between the components along which a heated fluid flows to one of the components for generating power from fluids at intermediate pressures; and
  a cooling circuit fluidly coupled to the pathway to cool a portion of the heated fluid prior to the portion of the heated fluid reaching the one of the components for generating power from fluids at intermediate pressures, wherein the cooling circuit includes:
    a first conduit tapping into the pathway between the components for generating power from fluids at high and intermediate pressures, wherein a portion of the heated fluid flows into the first conduit from the pathway,
    a chamber fluidly coupled to the first conduit and a source of a mixing fluid, the mixing fluid having a lower temperature than the heated fluid, wherein the heated fluid and the mixing fluid combine within the chamber to yield a cooled combined fluid, and wherein the mixing fluid includes an exhaust output from one of the components for generating power at high pressures and the components for generating power at intermediate pressures, and
    a second conduit fluidly coupled to the chamber and the pathway, between the components for generating power from fluids at high and intermediate pressures and downstream from the first conduit, wherein the cooled combined fluid flows from the chamber into the pathway through the second conduit.

2. The power plant according to claim 1, wherein the components comprise high and intermediate pressure steam turbines, the fluids comprise high and intermediate pressure steam, and the heated fluid comprises steam leakage.

3. The power plant according to claim 1, further comprising a plurality of seals disposed between the components to define the pathway.

4. The power plant according to claim 1, further comprising a heat exchanger coupled to the mixing chamber whereby at least the portion of the heated fluid is cooled.

5. The power plant according to claim 1, wherein heat removed from the portion of the heated fluid is transmitted to exhaust output of one or more of the components.

6. The power plant according to claim 1, wherein the cooling circuit exposes or combines approximately 3 parts of the portion of the heated fluid to or with approximately 8 parts of a relatively less heated fluid.

7. A power plant, comprising:
  first and second components for generating power from first and second fluids at first and second pressures, respectively, the second pressure being lower than the first pressure;
  a plurality of intermediate components defining a pathway along which a third fluid at a first temperature flows from an outlet of the first component to an inlet of the second component; and
  a cooling circuit fluidly coupled at a starting end thereof to a first location of the pathway defined downstream from the outlet of the first component and at a terminal end thereof to a second location of the pathway defined downstream from the first location and upstream from the inlet of the second component, wherein the cooling circuit includes:
    a first conduit tapping into the pathway along which the third fluid flows,
    a chamber fluidly coupled to the first conduit and a source of a fourth fluid, the fourth fluid having a lower temperature than the first temperature, wherein the third fluid and the fourth fluid combine within the chamber to yield a cooled fluid, and
    a second conduit fluidly coupled to the chamber and the pathway and positioned downstream from the first conduit, wherein the second conduit feeds the cooled fluid from the chamber into the pathway with a maintained pressure relative to the third fluid.

8. The power plant according to claim 7, wherein the first and second components comprise high and intermediate pressure steam turbines, respectively.

9. The power plant according to claim 7, wherein the first and second fluids comprise high and intermediate pressure steam, respectively.

10. The power plant according to claim 7, wherein the plurality of intermediate components comprises a plurality of seals disposed between the first and second components.

11. The power plant according to claim 7, wherein the third fluid comprises steam leakage.

12. The power plant according to claim 7, wherein the circuit comprises:
   a first conduit tapping into the pathway at the first location;
   a second conduit tapping into the pathway at the second location between the first location and the inlet of the second component; and
   a mixing chamber fluidly coupled to the first and second conduits in which the portion of the third fluid is exposed to or combined with the fourth fluid.

13. The power plant according to claim 12, further comprising a heat exchanger coupled to the mixing chamber whereby heat is removed from the portion of the third fluid.

14. The power plant according to claim 7, wherein the fourth fluid comprises exhaust output of the first component.

15. The power plant according to claim 7, wherein the fourth fluid comprises exhaust output of the second component.

16. The power plant according to claim 7, wherein the plurality of intermediate components comprises:
   a first group of seals; and
   a second group of seals,
   wherein the first conduit taps into the pathway between first and second ones of the second group of seals;
   and wherein the second conduit taps into the pathway between the second and a third one of the second group of seals.

17. The power plant according to claim 7, wherein the circuit exposes or combines approximately 3 parts of the portion of the third fluid to or with approximately 8 parts of the fourth fluid.

18. A power plant, comprising:
   a high pressure steam turbine (HPST) for generating power from high pressure steam;
   an intermediate pressure steam turbine (IPST) for generating power from intermediate pressure steam;
   a plurality of seals defining a pathway along which steam leakage at a high temperature flows from an outlet of the HPST to an inlet of the ISPT; and
   a cooling circuit fluidly coupled at a starting end thereof to a first location of the pathway defined between two of the seals and downstream from the outlet of the HPST and at a terminal end thereof to a second location of the pathway defined between two of the seals and downstream from the first location and upstream from the inlet of the IPST, wherein the cooling circuit includes:
      a first conduit tapping into the pathway along which the steam leakage flows,
      a chamber fluidly coupled to the first conduit and a source of a mixing fluid, the mixing fluid having a lower temperature than the high temperature, wherein the steam leakage and the mixing fluid combine within the chamber to yield a cooled fluid, and
      a second conduit fluidly coupled to the chamber and the pathway and positioned downstream from the first conduit, wherein the second conduit feeds the cooled fluid from the chamber into the pathway with a maintained pressure relative to the steam leakage.

* * * * *